United States Patent
Liu et al.

(10) Patent No.: US 9,585,229 B2
(45) Date of Patent: Feb. 28, 2017

(54) ANTICIPATORY LIGHTING FROM DEVICE SCREENS BASED ON USER PROFILE

(71) Applicant: Google Inc., Mountain View, CA (US)

(72) Inventors: Eric H C Liu, Santa Clara, CA (US); Jonathan James Effrat, Mountain View, CA (US); Charles Goran, Morgan Hill, CA (US)

(73) Assignee: GOOGLE INC., Mountain View, CA (US)

( * ) Notice: Subject to any disclaimer, the term of this patent is extended or adjusted under 35 U.S.C. 154(b) by 442 days.

(21) Appl. No.: 14/276,964

(22) Filed: May 13, 2014

(65) Prior Publication Data

US 2016/0029458 A1    Jan. 28, 2016

(51) Int. Cl.
   *G05B 13/02*      (2006.01)
   *H05B 37/02*      (2006.01)
   *H05B 33/08*      (2006.01)

(52) U.S. Cl.
   CPC ......... *H05B 37/0227* (2013.01); *H05B 33/08* (2013.01); *H05B 37/02* (2013.01); *Y02B 20/42* (2013.01); *Y02B 20/46* (2013.01); *Y02B 20/48* (2013.01)

(58) Field of Classification Search
   None
   See application file for complete search history.

(56) References Cited

U.S. PATENT DOCUMENTS

| | | | | |
|---|---|---|---|---|
| 7,136,709 B2* | 11/2006 | Arling | ................... | G05B 15/02 340/3.1 |
| 7,242,152 B2* | 7/2007 | Dowling | .............. | H05B 37/029 315/169.1 |
| 7,864,043 B2* | 1/2011 | Camp, Jr. | ............. | G01S 5/0252 340/539.13 |
| 8,339,247 B2* | 12/2012 | Adamson | ........... | H05B 37/0272 340/13.26 |
| 8,352,079 B2* | 1/2013 | Wendt | ..................... | A63F 13/02 315/312 |
| 8,427,076 B2* | 4/2013 | Bourquin | ........... | H05B 37/0245 315/149 |
| 8,478,306 B2* | 7/2013 | Zheng | ............... | H04M 1/72569 455/433 |
| 8,509,453 B2* | 8/2013 | Bychkov | .............. | H04R 1/1033 381/74 |

(Continued)

FOREIGN PATENT DOCUMENTS

| WO | WO 2013/111134 | 8/2013 |
|---|---|---|
| WO | WO 2013/186665 | 12/2013 |

OTHER PUBLICATIONS

Rubinstein et al. "Standardizing Communication Between Lighting Control Devices", 2003 IEEE, pp. 805-811.*

(Continued)

*Primary Examiner* — Van Nguyen
(74) *Attorney, Agent, or Firm* — Morgan, Lewis & Bockius LLP

(57) ABSTRACT

Systems, methods, and computer readable storage mediums are provided for determining the mood of the user, deriving an appropriate lighting scheme, and then implementing that lighting scheme on all devices within a predetermined proximity to that user. Furthermore, when a user begins a task, the devices can track the user and use lighting from nearby screens to offer functional lighting.

20 Claims, 7 Drawing Sheets

(56) References Cited

U.S. PATENT DOCUMENTS

| | | | | |
|---|---|---|---|---|
| 8,866,750 B2* | 10/2014 | Bentsen | ............... | G06F 3/03547 |
| | | | | 345/173 |
| 8,958,828 B2* | 2/2015 | Zheng | ............... | H04M 1/72569 |
| | | | | 340/313 |
| 9,167,672 B2* | 10/2015 | Engelen | ................... | H04N 1/60 |
| 9,301,372 B2* | 3/2016 | Spaulding | .......... | H05B 37/0227 |
| 9,451,673 B2* | 9/2016 | Bockle | ............... | H05B 37/0263 |
| 2005/0096753 A1 | 5/2005 | Arling et al. | | |
| 2005/0128192 A1 | 6/2005 | Heintzman et al. | | |
| 2010/0244745 A1 | 9/2010 | Wendt | | |

OTHER PUBLICATIONS

Hui et al. "Research on Device Identify Mechanism in Performance Lighting Network Control System", 2009 IEEE, 3 pages.*
Jiang et al. "Research on device identity Mechanism for Network Lighting Control System", 2010 IEEE, pp. 446-449.*
Google Inc., International Search Report and Written Opinion, PCT/US2015/030365, Aug. 27, 2015, 16 pgs.

* cited by examiner

Lighting Map
400

| Device Name | Position | Orientation | State | Additional Info |
|---|---|---|---|---|
| x | x | x | x | x |
| x | x | x | x | x |
| | | | | |
| x | x | x | x | x |

402 — Device Name
404 — Position
406 — Orientation
408 — State
410 — Additional Info

Figure 4

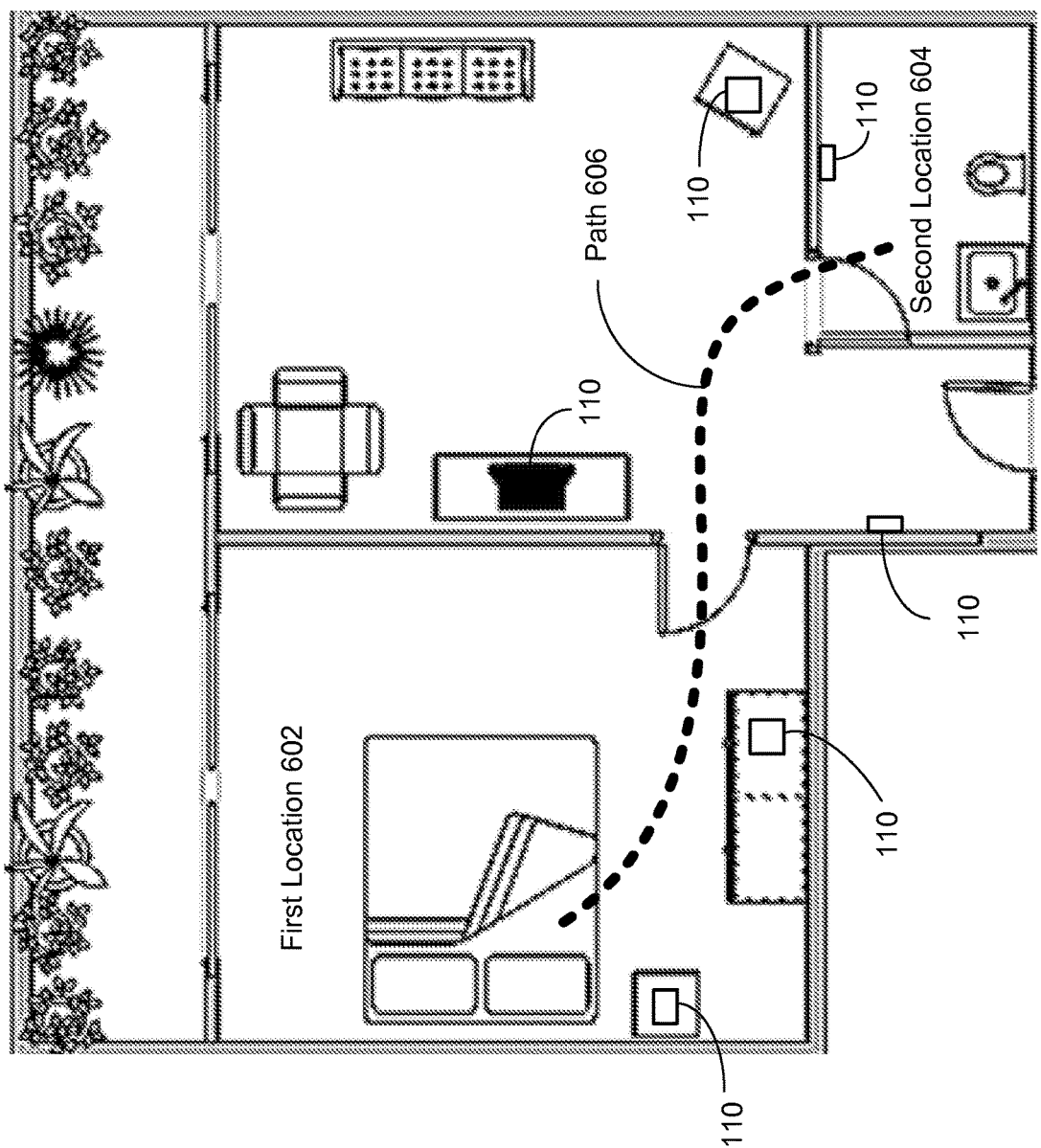

ANTICIPATORY LIGHTING FROM DEVICE SCREENS BASED ON USER PROFILE

TECHNICAL FIELD

The disclosed implementations relate generally to lighting systems for homes offices and other indoor lighting environments.

BACKGROUND

An immediate environment can have a large functional and emotional impact on a user. A large part of this is indoor lighting. Lighting is traditionally part of the house and separate from the ecosystem of electronic devices surrounding a user. Thus, the lighting surrounding a user is typically "dumb". It is not personalized, and it is not optimized to the user based on his/her functional needs or emotional state. Even in networked home lighting systems, the devices are mostly manual, or manually programmed. For instance, some such lighting systems may allow a user to set timing so that lights will come on at a certain time, or react to motion sensing. Furthermore, the systems utilize traditional lighting sources like light bulbs and track lighting, which have limited capabilities. These systems also do not consider the emotional or intellectual state of the user. It would be advantageous to provide a mechanism and method that overcomes the limitations and disadvantages of current home lighting.

SUMMARY

The present invention overcomes the limitations and disadvantages described above by providing methods, systems, and computer readable storage mediums for determining the mood of the user, deriving an appropriate lighting scheme, and then implementing that lighting scheme on all devices within a predetermined proximity to that user, including conventional lighting devices, such as lamps, track lighting and overhead lighting, and unconventional lighting devices, such as phones, tablets, TVs, and clocks.

The following presents a summary of the invention in order to provide a basic understanding of some of the aspects of the invention. This summary is not an extensive overview of the invention. It is not intended to identify key/critical elements of the invention or to delineate the scope of the invention. Rather, this summary presents some of the concepts of the invention in a simplified form as a prelude to the more detailed description that is presented later.

Various implementations of systems, methods and devices within the scope of the appended claims each have several aspects, no single one of which is solely responsible for the desirable attributes described herein. Without limiting the scope of the appended claims, some prominent features are described herein. After considering this discussion, and particularly after reading the section entitled "Detailed Description" one will understand how the features of various implementations are used.

One aspect of the disclosure is a method for adaptive lighting. The method takes place at a computer system having one or more processors and memory storing programs for execution by the one or more processors. A lighting map of lighting devices within a predefined area is accessed. The lighting devices include one or more non-conventional lighting devices. Each of the lighting devices has one or more lighting characteristics, such as state (e.g., on/off state and current color settings), screen size (if the device is non-conventional, such as a smart phone, TV or clock radio) and lighting capabilities (e.g., maximum brightness). The lighting devices are controllable via one or more networks such as Bluetooth, Wi-Fi, and cellular networks. The map indicates, for each of the lighting devices, at least the lighting device's position/location and current state. In some implementations, the map also indicates the a device's orientation.

In some implementations, real time contextual information is obtained for a user. This information is obtained, for instance, from a set of networked sensors, which can include one or more of cameras, microphones, network routers, and local or on-premises weather stations. Contextual information can also be obtained from the user's devices, In some implementations, the contextual information includes the user's location within the predefined area (e.g., the room in which the user is located in a dwelling), time of day, and one or more indications of: user movement, sound in proximity to the user's location, ambient light level in proximity to the user's location, calendar events, web interactions, and device interactions. Then, based on the contextual information, a user's task and a lighting need associated with the user task is inferred. Furthermore, based on the user's location, a first subset of the lighting devices that are located in proximity to the user's location are determined from the lighting map. At least one non-conventional lighting device, such as a phones, tablet computer, TV, or clock, is included in the subset of the lighting devices. Then the lighting characteristics of the subset of the lighting devices are controlled via one or more of the networks to provide a response to the lighting need. In some implementations, the response is performed over a predefined time period to achieve lighting effects that change over time to provide a desired lighting effect.

Some implementations provide a centralized lighting controller system comprising one or more central processing units, CPU(s), for executing programs and also includes memory storing the programs to be executed by the CPUs. The programs include instructions to perform any of the implementations of the aforementioned adaptive lighting method. Some implementations of a centralized lighting controller system also include program instructions to execute the additional options discussed below.

Yet other implementations provide a non-transitory computer readable storage medium storing one or more programs configured for execution by a computer. The programs include instructions to perform any of the implementations of the aforementioned adaptive lighting method. Some implementations of a non-transitory computer readable storage medium also include program instructions to execute the additional options discussed below.

Thus, these methods, systems, and storage mediums provide new, more intuitive, and more efficient ways to provide lighting to a user utilizing non-traditional lighting devices.

BRIEF DESCRIPTION OF THE DRAWINGS

For a better understanding of the aforementioned aspects of the invention as well as additional aspects and implementations thereof, reference should be made to the Description of Implementations below, in conjunction with the following drawings in which like reference numerals refer to corresponding parts throughout the figures.

FIG. 4 is block diagram illustrating a data structure for a lighting map, in accordance with some implementations.

FIG. 6 is a schematic/blue print for an example set of rooms inhabited by a user, in accordance with some implementations.

Like reference numerals refer to corresponding parts throughout the drawings.

DESCRIPTION OF IMPLEMENTATIONS

Figure 1A:
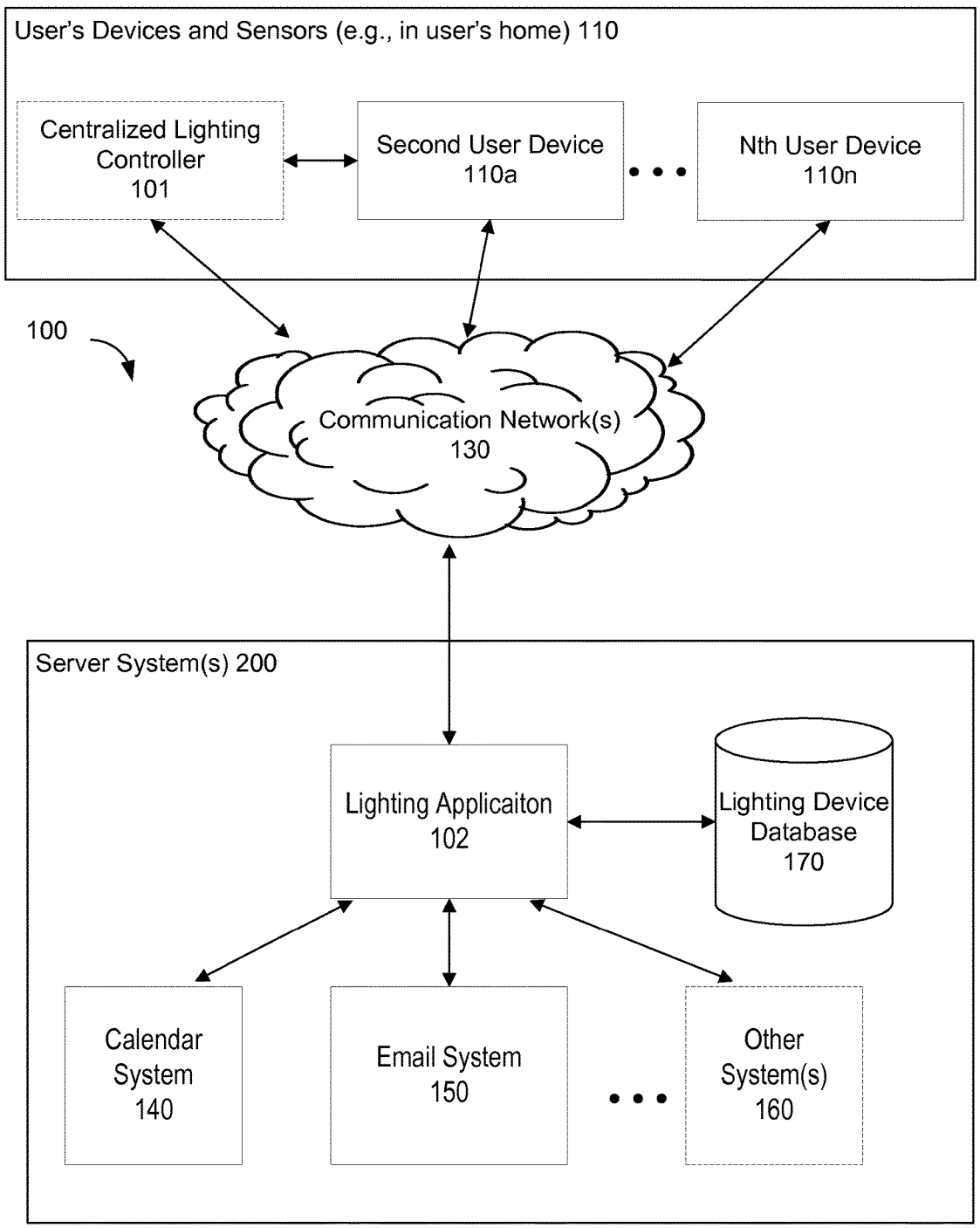
FIG. 1A is a block diagram illustrating a distributed computer system in accordance with some implementations.

Reference will now be made in detail to implementations, examples of which are illustrated in the accompanying drawings. In the following detailed description, numerous specific details are set forth in order to provide a thorough understanding of the present implementations. However, it will be apparent to one of ordinary skill in the art that the present various implementations may be practiced without these specific details. In other instances, well-known methods, procedures, components, and networks have not been described in detail so as not to unnecessarily obscure aspects of the implementations.

Screen sizes of smart devices are growing rapidly. Smart phones with screen sizes of 4" or more, with a full range of color display capabilities are now available. Furthermore, smart TV's are becoming more popular, and screen sizes are reaching 84 inches. At these sizes, smart TV's now have a significant impact on the lighting of a room. Tablets, phones, and clocks with display screens may also have an impact on the lighting of a room, especially when light levels are low. As screens continue to grow (in both size and in use), the lighting impact of these screens will grow as well. In addition, screens from devices are often the only task lighting readily available. For example, people often use their phones as flashlights, but this manual process is suboptimal.

Some home automation products allow a user's smart phone to control the lighting and HVAC (Heating, Ventilation and Air Conditioning) in a house. However, these devices are mostly manual. For instance, some home automation products allow for remote manual control of a home's lighting. Some allow the user to set timing so that lights will come on at a certain time. Some devices have algorithms to learn patterns based on a user's manual adjustment of the thermostat. However, these systems are not configurable to provide anticipatory lighting using convention and no-conventional lighting devices.

In contrast, some implementations described herein involve a computing system that determines the mood or lighting needs of a user (or a plurality of different users in different lighting zones of a house or business), derives an appropriate lighting scheme/plan, and then implements that lighting scheme on all devices within a predetermined proximity to that user. Furthermore, when a user begins a task, environmental sensors (including cameras and motion sensors) and smart devices (including devices used for lighting, such as smart phones with GPS and accelerometer capabilities) can track the user and use lighting from nearby screens or conventional lights to offer functional lighting—as long as those lighting devices are receptive to network control (either directly or indirectly) of their lighting capabilities.

In some implementations, described in more detail below, large display screens (e.g., flexible, roll-to-roll displays) may cover a larger percentage of a room. In this case, the screens are the main light source rather than traditional standalone floor lamps. As such, the lighting available from each screen can be widely customized. For example, screen lighting attributes, including any one of brightness, shape, color, size, and motion of an endless number of lights displayed on the screen. Lights can travel with the user or dim and brighten like a heartbeat.

FIG. 1A is a block diagram illustrating a distributed computer system 100 in accordance with some implementations. The distributed computer system 100 includes a plurality of lighting devices and sensors 110 associated with one or more users. A lighting device can be a non-traditional lighting device such as a television, video projector, smart phone, tablet computer, computer display, laptop computer, audio component, or appliance. A lighting device 110 can also be a traditional lamp or overhead light. In some implementations, each lighting device 110a-n is a networked electronic device with a controllable lighting element. For instance, each lighting device 110 may independently have network capabilities or it may be connected to a power transformer, a charging device, a controllable power outlet, an adapter at a power outlet, power switch, or light socket that can be used to control an otherwise "dumb" (i.e., un-networked) lamp or appliance by for instance switching on or off the adapter. In some implementations, devices 110 that possess substantial computing and communications capabilities can perform at least some operations associated with the lighting application 102 so as to provide control of other device's lighting behaviors.

In some implementations, the devices and sensors also include a centralized lighting controller 101 which receives information from lighting devices and sensors 110, and sends commands to lighting devices 110 via an application program interface. In some implementations, the lighting controller 101 is configured to know when a user using any devices that run a common operating system (e.g., Android) and then coordinate operations with those devices using commands and data formats associated with that operating system. In some implementations, the lighting controller 101 is also configured to perform at least some operations associated with the lighting application 102, such as analyzing data from sensors and lighting devices and predicting a user's tasks. In other implementations, the lighting controller application 101 merely receives information from other lighting devices 110 and sends some or all of the information on to the server's lighting application 102 for analysis operations, such as user task prediction. The user's devices and sensors 110 (either directly or through the centralized lighting controller 101) communicate with server system(s) 200 through a communication network 130 such as the Internet, other wide area networks, local area networks, metropolitan area networks. The server system(s) 200 include a lighting application 102 that receives information (directly or indirectly) from lighting devices and sensors 110, predicts user's tasks, and sends commands to lighting devices 110 via an application program interface (API). In some implementations, the lighting application 102 interacts with a variety of other systems to obtain additional information about the user's activities and current state such includes a calendar system 140, an email system 150, and other systems (e.g., a search system, a social networking system, an entertainment system for watching videos, movies, and the like). The server system lighting application 102 may also references a lighting device database which serves as a reference of lighting characteristics for a wide range of conventional and non-conventional devices.

Figure 1B:
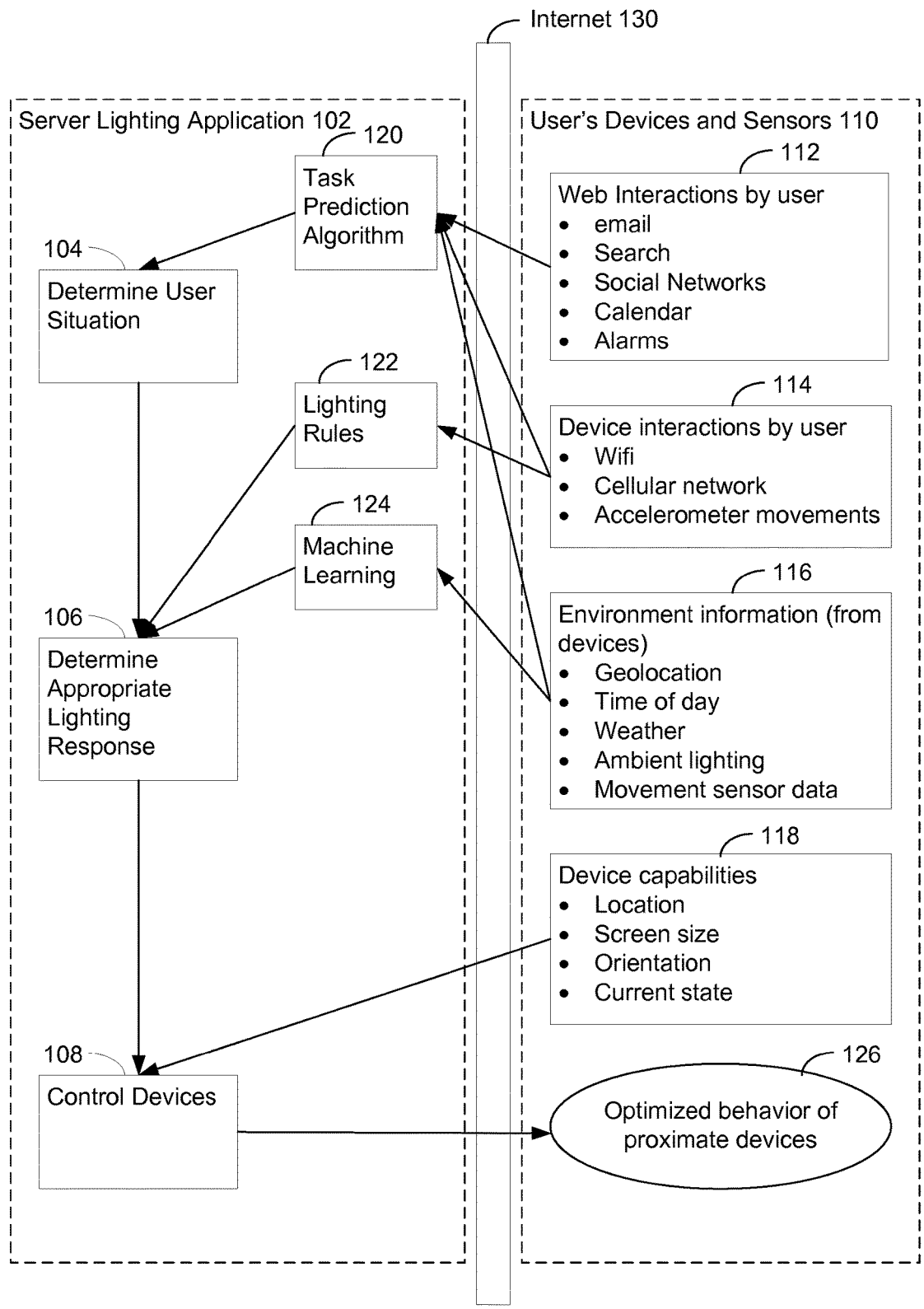
FIG. 1B is a block diagram illustrating system for effecting lighting based on a user's situation, in accordance with some implementations.

FIG. 1B illustrates a system for effective lighting based on a user's situation. There are three main aspects of this system, which can be implemented by a lighting application 102 performed on a server (e.g., in one or more servers coupled to one or more users and their devices and sensors 110 via the Internet 130): determining the user situation 104, determining the appropriate lighting response 106, and controlling devices 108 near a user to implement the appropriate response. In different implementations, operations illustrated as being performed by the lighting application 102 can be performed for a particular user by a lighting controller (e.g., centralized lighting controller 101, FIG. 1) which is located on premises (e.g., in a user's house or business). In some implementations, the operations are performed by a combination of the server lighting application 102 and an on-premises lighting controller (101, FIG. 1). In the following descriptions, no particular system configuration is required and the described implementations are intended merely as non-limiting examples.

In accordance with FIG. 1B, first the user's situation is determined 104. In this step, a profile of both what the user is likely to be doing next and the general mood of the user are determined. This is based at least in part on information determined from the user's devices and/or sensors 110. In some implementations, information is obtained from web activity history 112 from for instance: the user's interactions with: email (e.g., web based email activity), search history, social networking activities, calendar, and alarms. In some implementations, information is obtained from a user's device interactions 114 such as: Wi-Fi hotspot activity, connections to a cellular network, accelerometer movements of a device (e.g., from a handheld or wearable device). In some implementations, environmental information 116 is obtained such as: Geo-location (e.g., from a GPS), Location, time of day (from device clock), weather (from sensors or from weather source based on location), ambient lighting (of the device based on screen state and/or of room based on sensors), movement sensor data (e.g., from accelerometer or other from motion sensors sensing motion of device or motion of the user or other objects near the device). In some implementations, device capabilities information 118 is also obtained such as: screen size, orientation (e.g., from device's gyroscope), current state (on/off and current brightness settings).

With this information, tasks are predicted utilizing a task prediction algorithm 120. Tasks could include: user needs to wake up, user needs to calm down (e.g., sleep), user needs to go to a meeting, user is sleeping, user is reading, user is watching a TV, user needs to use the bathroom, etc.

In accordance with FIG. 1B, an appropriate lighting response is then determined 106. With the user's task (and thus his or her need) determined 120, the next action is to combine it with lighting rules 122 and machine learning information 124. The appropriate lighting response includes a model of proper lighting. This model takes situations and creates the proper lighting environment using a combination of conventional networked lighting devices (e.g., light bulbs of different types) and non-conventional networked lighting devices (e.g., electronic device with illuminated display screen). The output of this is recommended light levels at different proximity to the user over time.

In accordance with FIG. 1B, nearby devices are then detected and controlled 108. To do so an API (204, FIG. 2) is implemented that allows the lighting application 102 to control certain aspects of each device. For instance, in some implementations, the lighting application 102 interacts with a lighting controller 101 that controls the displays of the user devices 110: Examples of lighting controls include: color temperature, brightness, display on/off, as well as showing specific symbols or messages in some implementations. As such, behavior of lighting devices proximate to the user are optimized 126, e.g., lighting characteristics for nearby the lighting devices are controlled to satisfy a determined user lighting need, as explained in more detail with respect to FIG. 5.

The API is configured to allow the devices to report several key characteristics so that the lighting application 102 can generate a map of the devices and use them appropriately:

Location/distance from user
Screen size
Screen orientation (which way it is facing)
Screen type (emissive, reflective like, e-ink)
Current state (on, off, brightness etc.)

With this information, the system can tune the lighting near a user for maximum benefit in both mood and functionality.

Example 1

Mood

Jacob wakes up at 7:00 AM in the morning. His bedroom television comes on dimly and shows beautiful outdoor images with warm colors. It makes him feel happy and relaxed. He turns his phone on out of habit. The screen is also dim with all the colors shifted to warm colors. He lies in bed a little longer. At 8:00 AM is phone alarm goes off, telling him he has a meeting at 9:00 AM. He hits snooze. By now the brightness on his TV has gone up, and it is lighting up the whole room. It is getting yellower and whiter in color. The next time the alarm comes on, his phone is at full brightness. The TV is on full brightness, and the room lights have even automatically come on. His wall sized screens, (e.g., digital picture frames and clocks) go on as well. Then Jacob looks at the calendar event and realizes he doesn't need to go to the meeting. He replies no to the meeting. The screens near him stay on, but shift back to a more soothing color and brightness.

In the above example, that the lighting application 102 first receives information from devices and sensors 110 in Jacob's domicile providing via an API Jacob's location, time of day, and devices in use etc. The lighting application 102 determines that Jacob is still in bed at 7 AM (and has nothing on his calendar until 9 AM). The lighting application 102 determines that he should be getting up at 8 AM and then send commands via the API to lighting devices (both conventional and non-conventional) in proximity to Jacob to adjust the screen brightness and color temperature of those devices accordingly to move from being during the night, to turning on and providing a gradual brightening during the morning. When Jacob actively interacts with his devices, such as turning on his phone at 7:00 AM, hitting snooze at 8:00 AM, and replying "No" to the meeting at 9:00 AM, the lighting application 102 adjusts its lighting script to take into account Jacobs's current state. For instance the lighting application 102 sends instructions for dimming the device screens and returning to more soothing colors when Jacob replies "No" to the 9:00 AM meeting. In some implementations, the lighting application 102 sends the instructions to a local lighting controller 101 to control the appropriate client devices 110, while in other implementations all of some of functions of the lighting application 102 are performed locally on at the lighting controller 101.

Example 2

Nightlight

Mary wakes up at 2:00 AM to use the restroom. She doesn't want to wake her husband though who is a light sleeper. She slips out of her bed. Immediately, floor lights near her feet come on so that she can put on her slippers. Then a corner of her TV illuminates with a dim arrow (with, possibly, an explanatory message) pointing towards the bathroom. As she walks towards the TV and reaches the hallway, the radio she has in the bathroom turns on its screen which makes a soft glow emanate from the bathroom. She walks into the bathroom without ever turning on a light. As she heads back to bed, the radio, TV, and floor lights automatically turn off In the above example, the lighting application 102 first receives information from devices and sensors 110 in Mary's domicile providing via an API Mary's location, time of day, and devices in use etc. The lighting application 102 determines that Mary is asleep and in bed. The lighting application 102 determines that she should be sleeping sends commands via the API to lighting devices (both conventional and non-conventional) in proximity to Mary to have the devices off or on a dim sleep mode brightness and color temperature. Then when sensors (such as motion sensors) determine that Mary has slipped out of bed, the lighting application 102 adjusts its lighting script to take into account Mary's current state and her anticipated task. For instance the lighting application 102 sends instructions to device screens for providing lighting and directional guidance along her path, and then provides instructions to the devices to turn back off after she has returned to bed. As discussed with the previous example, in some implementations, the lighting application 102 sends the instructions to a local lighting controller 101 to control the appropriate client devices 110, while in other implementations all of some of functions of the lighting application 102 are performed locally by the lighting controller 101.

Figure 2:
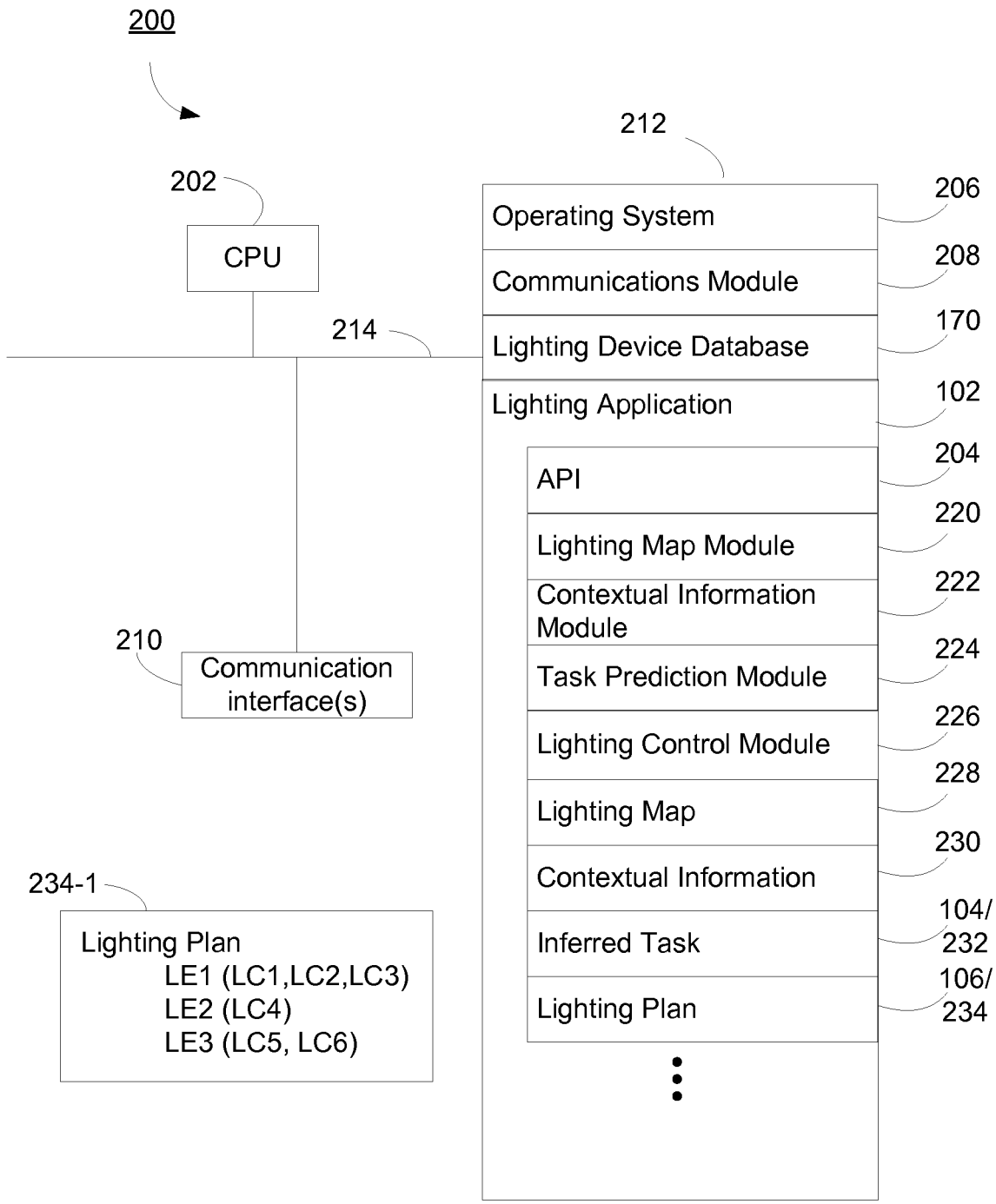
FIG. 2 is a block diagram illustrating an example server, in accordance with some implementations.

FIG. 2 is a block diagram illustrating a server 200 in accordance with some implementations. The server 200 typically includes one or more processing units (CPU's) 202, one or more network or other communications interfaces 210, memory 212, and one or more communication buses 214 for interconnecting these components. The communication buses 214 optionally include circuitry (sometimes called a chipset) that interconnects and controls communications between system components. The server 200 optionally includes a user interface (not shown) comprising a display device and one or more input device(s), such as a keyboard, a mouse, touch sensitive display screen, or other pointing device. Memory 212 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 212 optionally includes one or more storage devices remotely located from the CPU(s) 202. Memory 212, or alternately the non-volatile memory device(s) within memory 212, comprises a non-transitory computer readable storage medium. In some implementations, memory 212 or the computer readable storage medium of memory 212 stores the following programs, modules and data structures, or a subset thereof:

- an operating system 206 that includes procedures for handling various basic system services and for performing hardware dependent tasks;
- a network communication module 208 that is used for connecting the server 200 to other computers via the one or more communication network interfaces 210 (wired or wireless) and one or more communication networks, such as the Internet, other wide area networks, local area networks, metropolitan area networks, and so on;
- a lighting device database 170 that serves a reference of lighting characteristics for a wide range of conventional and non-conventional devices (this can also be located remotely from the server 200 and accessed by the server 200 via a network connection);
- a lighting application 102 which receives information from lighting devices and sensors 110, predicts user's tasks, and sends commands to lighting devices 110 via an application program interface (API) 204 in order to implement a context-appropriate lighting plan. As noted above, in some implementations the lighting application 102 can formulate and manage multiple lighting plans for multiple users in different lighting areas of the same house or business. In some implementations, the lighting application 102 can formulate and manage multiple lighting plans for multiple different lighting areas of the same house or business. In some implementations, the lighting application includes at least some of the following modules and data structures:
  - a lighting map module 220, which creates and later accesses a lighting map 228 of lighting devices, (as described in more detail with respect to FIG. 5);
  - a contextual information determination module 222 for obtaining information 230 associated with the context of one or more users such as, for each user, location, time of day etc (e.g., from components 112, 114, and 116 of FIG. 1B);
  - a task prediction/task inference module 224 that includes a task prediction algorithm for determining a user task/situation 104/232 as described with respect to FIG. 1B; and
  - a lighting control/lighting response module 226 for controlling the lighting characteristics of at least some of the lighting devices proximate to the user according to a lighting plan 106/234 formulated by the lighting application 102 as described with respect to FIG. 1B. In some implementations, the lighting plan includes one or more lighting events, each involving a combination of lighting operations to be performed at one or more of the lighting devices via one or more lighting commands, as instructed the API 204. For example, an example lighting plan 234-1 includes three lighting events LE1, LE2 and LE3, where Lighting event LE1 is implemented via three Lighting commands LC1, LC2, LC3 which can be issued to respective or multiple lighting devices), Each of the above identified elements is typically stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various implementations. In some implementations, memory 212 stores a subset of the modules and data structures identified above. Furthermore, memory 212 may store additional modules and data structures not described above.

Figure 3:
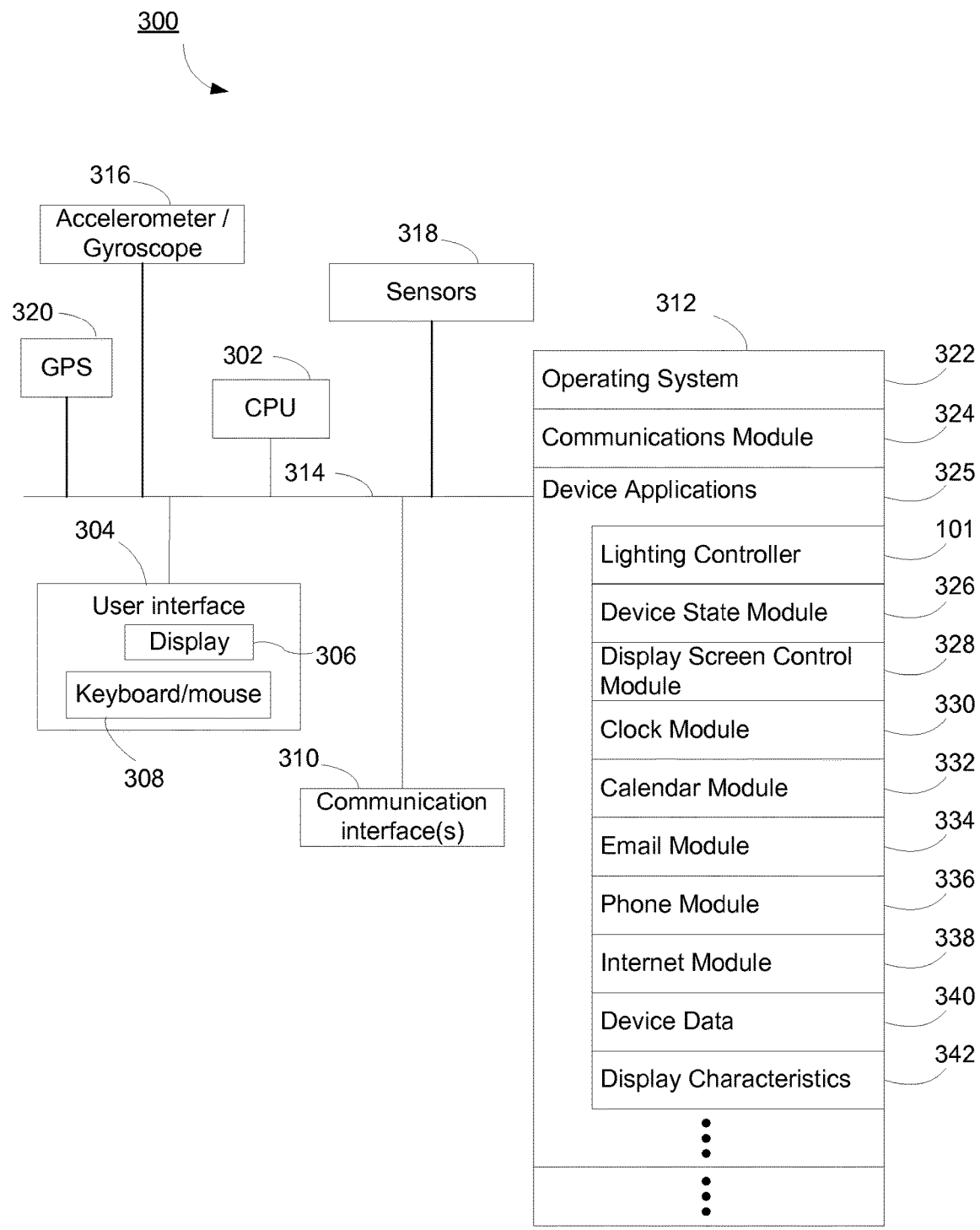
FIG. 3 is a block diagram illustrating an example client, in accordance with some implementations.

FIG. 3 is a block diagram illustrating a client 300 (such as a user device 110, or lighting controller 101) in accordance with some implementations. The client 300 typically includes one or more processing units (CPU's) 302, one or more network or other communications interfaces 310, memory 312, and one or more communication buses 314 for interconnecting these components. The communication buses 314 optionally include circuitry (sometimes called a chipset) that interconnects and controls communications between system components. The client 300 optionally includes a user interface 304 comprising a display device 306 (e.g., a display screen) and one or more input device(s) 308, such as a keyboard, a mouse, touch sensitive display screen, or other pointing device. In some implementations, the client 300 includes a gyroscope and/or accelerometer 316 for providing information about the devices' current orientation. In some implementations, the client 300 also includes a GPS 320 for determining and providing location information about the client device. The client device may include sensors 318 for sensing movement of the user (or other objects) near the client device 300, for sensing sound, and/or for sensing ambient light proximate to the client device. Memory 312 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 312 optionally includes one or more storage devices remotely located from the CPU(s) 302. Memory 312, or alternately the non-volatile memory device(s) within memory 312, comprises a non-transitory computer readable storage medium. In some implementations, memory 312 or the computer readable storage medium of memory 312 stores the following programs, modules and data structures, or a subset thereof:

an operating system 322 that includes procedures for handling various basic system services and for performing hardware dependent tasks;

a network communication module 324 that is used for connecting the client 300 to other computers via the one or more communication network interfaces 310 (wired or wireless) and one or more communication networks, such as the Internet, other wide area networks, local area networks, metropolitan area networks, and so on;

one or more device applications 325 for controlling various functions on the device such as:

a lighting controller application 101, which exists only in some implementations, which receives information from lighting devices and sensors 110, and sends commands to lighting devices 110 via an application program interface (API) 204. In some implementations, the lighting controller also predicts a user's tasks, while in other embodiments the lighting controller application 101 merely receives information from other lighting devices 110 and sends some or all of the information on to the server's lighting application for analysis such as user task prediction.

a device state module 326 that provides information regarding the on/off state, brightness/dimness of a screen, current user activity (e.g., phone, email, or other internet activity);

a display screen control module 328 for receiving instructions from a server 300 and implementing the instructions by controlling the display 306 as instructed (e.g., implementing a lighting plan by displaying colors, information, arrows etc); a a clock 330 for tracking a current time and providing current time to a server 300;

a calendar module 332, for tracking a users appointments and calendar events;

a email module 334, for sending and receiving email messages;

a phone module 336 for voice and text messaging;

a internet browsing module 338 for connecting to internet pages for searching, browsing, and performing social networking activities;

device data 340 such as device capabilities and other stored data; and display characteristics 342 such as orientation, number of pixels, color range etc.

Each of the above identified elements is typically stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various implementations. In some implementations, memory 312 stores a subset of the modules and data structures identified above. Furthermore, memory 312 may store additional modules and data structures not described above.

Although FIG. 2 shows a "server system 200" and FIG. 3 shows a "client system 300" these figures are intended more as functional description of various features present in a set of servers than as a structural schematic of the implementations described herein. In practice, and as recognized by those of ordinary skill in the art, items shown separately could be combined and some items could be separated. For example, some items shown separately in FIG. 2 could be implemented on a single server and single items could be implemented by one or more servers. The actual number of servers used to implement a server system 200 and how features are allocated among them will vary from one implementation to another, and typically depend in part on the amount of data traffic that the system must handle during peak usage periods as well as during average usage periods.

FIG. 4 is block diagram illustrating a data structure for a lighting map 400 associated with a user, in accordance with some implementations. In some implementations, the lighting map 400 includes at least a device name 402 or device id or other mechanism for identifying a particular device associated with a user. The position 404 (e.g., GPS location) of the device is includes. Some devices such as TVs, clocks, and digital picture frame remain relatively static. Other devices such as phones, tablets, and wearable devices (e.g., smart watches) should be queried/confirmed prior to utilizing them to satisfy a user's lighting need. The device's orientation 406 may also be recorded. In some implementations the orientation includes the directional facing of a display screen of the device. The device's state 408 is also recorded (e.g., on/off) in some implementations, a level of brightness/dimness is also recorded. Additional information 410 may also be stored in the lighting map.

Figure 5:
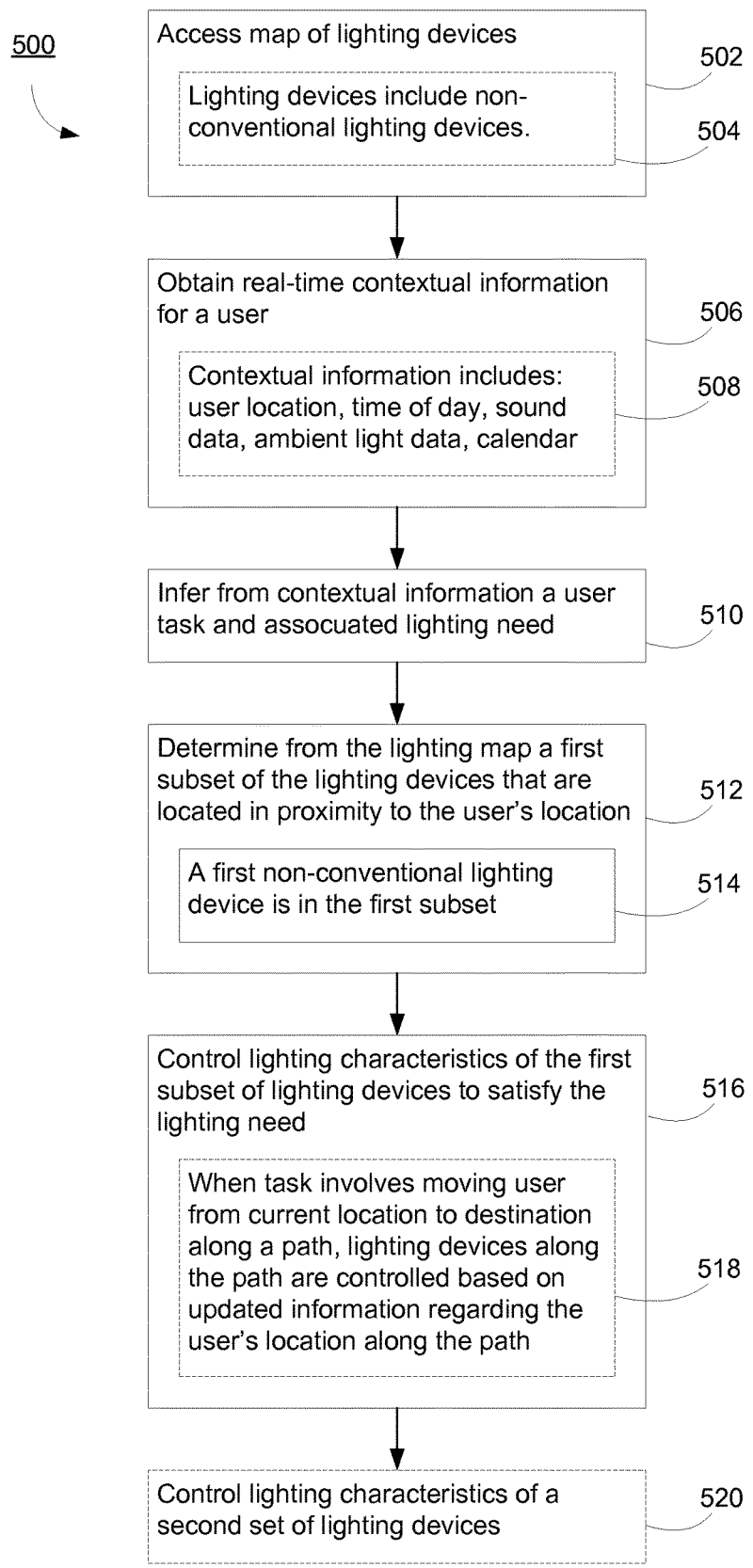
FIG. 5 is a flowchart representing a method of providing anticipatory lighting, in accordance with some implementations.

FIG. 5 is a flowchart representing a method 500 for providing adaptive and anticipatory lighting, according to certain some implementations. The method 500 is typically governed by instructions that are stored in a computer readable storage medium and that are executed by one or more processors. The method takes place at a computer system having one or more processors and memory storing programs for execution by the one or more processors. For example, the lighting method 500 can be performed by the lighting application 102 (FIG. 1), either at a server 200, an on-premises, centralized lighting controller 101, user device 110, or at some combination of the three.

A lighting map of lighting devices within a predefined area is accessed (502). In some implementations, the positions of lighting devices in lighting map are described with reference to rooms of a structure occupied by a user. Each of the lighting devices has one or more lighting characteristics such as on/off state and intensity. Furthermore, the lighting devices are controllable via one or more networks such as Bluetooth, Wi-Fi, and cellular network. In some implementations, the accessed map indicates, for each of the lighting devices, at least the lighting device's position and state. In some implementations, the map also indicates a device's orientation.

The lighting devices include one or more non-conventional lighting devices (504). For instance a non-conventional lighting device is typically a multi-functional illumination device. In some implementations, each of the non-conventional lighting devices is a networked, electronic device with a controllable, illuminated display screen. In some implementations, the non-conventional lighting device is selected from: a television, video projector, smart phone, tablet computer, computer display, laptop computer, audio component, or appliance. In other implementations, each of the non-conventional lighting devices is a networked, electronic device with a controllable lighting element. For instance, it may be a power transformer, a charging device, or a power outlet with a controllable status light.

Real time contextual information is obtained for a user (506). This information is obtained, for instance from a set of networked sensors. In some implementations, the contextual information includes current user location within the predefined area, time of day, and one or more indications of: user movement, sound in proximity to the user's location, ambient light level in proximity to the user's location, a user's calendar events, and or device interactions by the user and/or web interactions by the user (508).

Based on the contextual information, a user's task and the lighting needs associated with the user task are inferred (510). For instance, a user task may be waking up at a particular time. Other tasks include, walking somewhere, reading, sleeping, watching TV, using a computer, writing, painting, cooking, eating etc.

Furthermore, based on the user's location, a first subset of the lighting devices that are located in proximity to the user's location are determined from the lighting map (512). In some implementations, at least one of the first subset of the lighting devices is responsive to commands sent in accordance with an API configured to specify lighting characteristics, including one or more of lighting on/off state, and lighting hue, saturation and brightness. Furthermore, at least a first non-conventional lighting device is included in the subset of the lighting devices (514). In some implementations, the first non-conventional lighting device is configured to execute an operating system that can control display content and lighting characteristics, including one or more of display on/off state, and lighting hue, saturation and brightness for a plurality of addressable pixels of the display.

Then the lighting characteristics of the subset of the lighting devices are controlled via one or more of the networks to satisfy the lighting need of the user (516). As explained with respect to the previous figures, the control of the lighting devices is performed by the server lighting application 102, a lighting controller 101 at the user's location, or a combination of the two. The lighting devices are controlled within a predefined time period. For instance, as described in the nightlight and alarm clock examples above, the lights from various lighting devices will come on at different times and vary in intensities over time to meet the user's lighting need. In some implementations, controlling the lighting characteristics of the lighting devices includes controlling display content of at least one of the non-conventional lighting devices to provide a meaningful indictor to the user related to the inferred task. For instance, the meaningful indicator may include a text message, a graphic display, or a directional indicator. In some implementations, an accompanying audio message may also be provided. For instance it may to direct the user to a destination, provide an alarm sound, provide information regarding an upcoming meeting, etc.

In some implementations, the inferred task involves the user taking part in a particular activity in a particular place. For example, the inferred task can include the user going to sleep at night, getting up in the morning, having dinner in the kitchen, watching TV, or reading in the living room. For such tasks, controlling the lighting characteristics of the subset of the lighting devices includes the following steps. First, the current location of the user is identified. The lighting map is consulted to identify a first collection of lighting devices, including at least one non-conventional lighting device, that are proximate to the current location of the user. Based on the current location of the user, commands are sent to respective ones of the first collection of lighting devices to direct the first collection of lighting devices to provide illumination with lighting characteristics consistent with the inferred task and contextual information. For example, if the user is going to sleep (determined for example by the controller noting that it is late at night, lack of router activity, the user turning off a bedside lamp, and rustling sounds from the bed) the lighting controller identifies the lights in proximity to the user that are illuminated (including any device screens and power status lights that are illuminated) and sends commands to those devices via one or more computer networks to darken those lights to a level that is consistent with user preferences (e.g., anywhere from completely dark to dimly lit with a restful hue—e.g., dusky blue or purple). The controller can also identify a lighting device that can serve as a night light if so desired by the user per user preferences and then send commands to that device via one or more computer networks to set the illumination of that device to a level that is consistent with user preferences. Note also than any lighting plans implemented by the lighting controller can include a time element that allows the controller to gradually dim or brighten the lights in a room over time.

In some implementations, the inferred task involves the user moving from a current location, e.g., a first room, to a destination, e.g., a second room. For instance, the user movement may take place in a darkened environment and thus path guidance is needed. When the task involves a user moving from a current location to a destination along a path, a subset of lighting devices along the path are controlled based on updated information regarding the user's current location along the path (518). In some implementations, controlling the lighting characteristics of the subset of the lighting devices includes the following steps. First, the current location of the user is identified. The physical path of the user to the destination in context of the lighting map is also identified. The lighting map is consulted to identify a first collection of lighting devices, including at least one non-conventional lighting device, that are proximate to the current location of the user, the physical path of the user, and the destination. Then using environmental sensors the current location of the user sensed and updated. Based on the current location of the user, commands are sent to respective ones of the first collection of lighting devices to direct the first collection of lighting devices to provide illumination from the current location along the path to the destination with lighting characteristics consistent with the inferred task and contextual information.

In some implementations, a lighting map is prepared as follows. Network commands are sent to one or more of the lighting devices to cause respective ones of the one or more lighting devices to perform respective identifiable sequences of lighting events. For instance, a first example sequence for a first device might involve blinking off and on a status light in accordance with a repetitive short, short, long sequence. A second example sequence for a second device is a slow dimming of a status light followed by three quick blinks. Then a video camera is to locate in context of the lighting map positions of the respective lighting devices by identifying the identifiable sequences of lighting events. In other words, the video camera is used to determine the position of the first device by recognizing the first sequence.

In some implementations in addition to or as an alternative to the video based techniques discussed above, the location of lighting devices, especially those highly mobile lighting devices such as a phone or tablet, are identified by non-video based location techniques. For instance, in some implementations, audio and/or radio frequency triangulation is utilized to map a respective lighting device based on information received from a plurality of other static devices such as the router, TV, and smart thermostat, etc.

In some implementations prior user consent, explicit or implicit, is required in order for the user's lighting devices and sensors 110 to be accessed by the server lighting application 102. Thus, only information authorized by the user can be utilized for anticipatory lighting. This protects user privacy and to comply with relevant privacy laws or contract provisions. As a result, with a viewer's consent (e.g., by virtue of the user setting up an in home lighting controller 101 application or explicitly agreeing in advance to having data from their lighting devices and sensors sent to a server) is any private activity data used in creating anticipatory lighting.

Furthermore, in some implementations, using images from the video camera and a database of images of lighting devices, including images of non-conventional lighting devices, the device types are identified using visual matching techniques types of the respective lighting devices. In other implementations, the devices are identified by query. For instance, the networked devices are queried for information identifying their type, the received information regarding the device type is then stored. In some implementations, after the type of device is determined, a database of lighting devices is accessed to determine the lighting characteristics for an identified lighting device. In other implementations, the lighting characteristics of an identified and located lighting device are determined by recording lighting responses of the lighting device to a sequence of lighting commands. One benefit of recording lighting responses is that the system is then able to account for current orientation of devices. For instance, whether a tablet device has a screen facing downward (and thus of limited or no use for satisfying an identified lighting need associated with an inferred user task). As such, in some implementations, periodically the lighting characteristics of an identified and located lighting device are determined by recording lighting responses of the lighting device to a sequence of lighting commands.

Consequently, in some implementations, the system determines whether the lighting need was met by controlling lighting characteristics of the first set of lighting devices. Then, in response to determining that the lighting need was not met, the lighting characteristics of second set of lighting devices are controlled. In other words, an alternate lighting plan is developed based on a using of a different set of lighting devices to meet the lighting need.

Each of the operations shown in FIG. 5 typically corresponds to instructions stored in a computer memory or non-transitory computer readable storage medium. The computer readable storage medium typically includes a magnetic or optical disk storage device, solid state storage devices such as Flash memory, or other non-volatile memory device or devices. The computer readable instructions stored on the computer readable storage medium are in source code, assembly language code, object code, or other instruction format that is interpreted by one or more processors. Specifically many of the operations shown in FIG. 5 correspond to instructions in the a lighting map creation module 220, the contextual information determination module 222, the task prediction/task inference module 224, and the lighting control/a lighting response module 226 the server system 200 shown in FIG. 2.

FIG. 6 is a schematic/blue print for an example set of rooms inhabited by a user, in accordance with some implementations. In some implementations, an inferred user task involves the user moving from a current location, e.g., a first room 602, to a destination, e.g., a second room 604. For instance, the user movement may takes place in a darkened environment and thus path guidance is needed. When the task involves a user moving from a current location 602 to a destination 604 along a path 606, lighting devices 110 along the path are controlled based on updated information regarding the user's current location along the path. Specifically, controlling the lighting characteristics of the subset of the lighting devices 102 is performed in accordance with the description of operation 518 of FIG. 5.

The terminology used in the description of the implementations herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," as well as the terms "includes" and/or "including" when used in this specification, specify the presence of stated features, integers, steps, operations, elements, and/or components, but do not preclude the presence or addition of one or more other features, integers, steps, operations, elements, components, and/or groups thereof It will also be understood that, although the terms first, second, etc. may be used herein to describe various elements, these elements should not be limited by these terms. These terms are only used to distinguish one element from another. For example, a first element could be termed a second element, and, similarly, a second element could be termed a first element, without changing the meaning of the description, so long as all occurrences of the first element are renamed consistently and all occurrences of the second element are renamed consistently. The first element and the second element are both elements, but they are not the same element.

As used herein, the term "if" may be construed to mean "when" or "upon" or "in response to," depending on the context. Similarly, the phrase "if it is determined" or "if (a stated condition or event]) is detected" may be construed to mean "upon determining" or "in response to determining" or "upon detecting (the stated condition or event)" or "in response to detecting (the stated condition or event)," depending on the context.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method for adaptive lighting, comprising:
   at a computer system having one or more processors and memory storing programs for execution by the one or more processors:
      accessing a lighting map of lighting devices, wherein the lighting devices include one or more non-conventional lighting devices, each of the lighting devices has one or more lighting characteristics and are controllable via one or more networks, and the map indicates for each of the lighting devices at least lighting device position and lighting device on/off state;
      obtaining contextual information for a user, wherein the contextual information includes current user location, time of day, and one or more indications of: user movement, sound in proximity to the user's location, ambient light level in proximity to the user's location, user's calendar events, device interactions by the user, and web interactions by the user;
      based on the contextual information, inferring a user task and a lighting need associated with the user task;
      based on the user location, determining from the lighting map a first subset of the lighting devices that are located in proximity to the user's location, wherein the subset of the lighting devices includes at least a first non-conventional lighting device; and
      controlling the lighting characteristics of the first subset of the lighting devices via one or more of the networks to satisfy the lighting need.

2. The method of claim 1, wherein each of the non-conventional lighting devices is a networked, electronic device with a controllable, illuminated display screen.

3. The method of claim 2, wherein each of the non-conventional lighting devices is selected from: a television, video projector, smart phone, tablet computer, computer display, laptop computer, audio component, or appliance.

4. The method of claim 1, wherein each of the non-conventional lighting devices is a networked, electronic device with a controllable lighting element.

5. The method of claim 4, wherein each of the electronic devices is selected from: a power transformer, charging device, power outlet with a controllable status light, power switch adapter, and light socket adapter.

6. The method of claim 4, further comprising:
   determining whether the lighting need was met and, in response to determining that the lighting need was not met, determining from the lighting map a second subset of the lighting devices that are located in proximity to the user's location, and controlling the lighting characteristics of the second set of lighting devices via one or more of the networks to satisfy the lighting need.

7. The method of claim 1, wherein at least one of the first subset of the lighting devices is responsive to commands sent in accordance with an API configured to specify lighting characteristics, including one or more of lighting on/off state, and lighting hue, saturation and brightness.

8. The method of claim 1, wherein the first non-conventional lighting device is configured to execute an operating system that can control display content and lighting characteristics, including one or more of display on/off state, and lighting hue, saturation and brightness for a plurality of addressable pixels of the display.

9. The method of claim 1, wherein controlling the lighting characteristics of the lighting devices includes controlling display content of at least one of the non-conventional lighting devices to provide a meaningful indictor to the user related to the inferred task.

10. The method of claim 9, wherein the meaningful indicator includes a text message, a graphic display, or a directional indicator.

11. The method of claim 1, wherein the positions of lighting devices in the lighting map are described with reference to rooms of a structure occupied by the user.

12. The method of claim 1, further comprising:
    preparing the lighting map by:
       sending network commands to one or more of the lighting devices to cause respective ones of the one or more lighting devices to emit respective identifiable sequences of lighting events; and
       using a video camera to locate in context of the lighting map positions of the respective lighting devices by identifying the identifiable sequences of lighting events.

13. The method of claim 12, further comprising:
    using the video camera and a database of images of lighting devices, including images of non-conventional lighting devices, to identify using visual matching techniques types of the respective lighting devices.

14. The method of claim 12, further comprising:
    determining the lighting characteristics of an identified and located lighting device by recording lighting responses of the lighting device to a sequence of lighting commands.

15. The method of claim 1, further comprising:
    using the video camera, audio recording, or radio frequency triangulation to identify a location of a respective lighting device.

16. The method of claim 1, wherein the inferred task involves the user waking up in the morning.

17. The method of claim 1, wherein the inferred task involves the user moving from a current location to a destination.

18. The method of claim 17, wherein controlling the lighting characteristics of the subset of the lighting devices further comprises:
- identifying the current location of the user and a physical path of the user to the destination in context of the lighting map;
- consulting the lighting map to identify a first collection of lighting devices, including at least one non-conventional lighting device, that are proximate to the current location of the user, the physical path of the user, and the destination;
- sensing and updating using environmental sensors the current location of the user;
- based on the current location of the user, sending commands to respective ones of the first collection of lighting devices to direct the first collection of lighting devices to provide illumination from the current location along the path to the destination with lighting characteristics consistent with the inferred task and contextual information.

19. A centralized lighting control system, comprising:
one or more processors; and
memory storing one or more programs to be executed by the one or more processors;
the one or more programs comprising instructions for:
- accessing a lighting map of lighting devices, wherein the lighting devices include one or more non-conventional lighting devices, each of the lighting devices has one or more lighting characteristics that are controllable via one or more networks, and the map indicates for each of the lighting devices at least lighting device position and lighting device on/off state;
- obtaining contextual information for a user, wherein the contextual information includes current user location, time of day, and one or more indications of: user movement, sound in proximity to the user's location, ambient light level in proximity to the user's location, user's calendar events, device interactions by the user and web interactions by the user;
- based on the contextual information, inferring a user task and a lighting need associated with the user task;
- based on the user location, determining from the lighting map a first subset of the lighting devices that are located in proximity to the user's location, wherein the subset of the lighting devices includes at least a first non-conventional lighting device; and
- controlling the lighting characteristics of the first subset of the lighting devices via one or more of the networks to satisfy the lighting need.

20. A non-transitory computer readable storage medium storing one or more programs configured for execution by a computer, the one or more programs comprising instructions for:
- accessing a lighting map of lighting devices, wherein the lighting devices include one or more non-conventional lighting devices, each of the lighting devices has one or more lighting characteristics that are controllable via one or more networks, and the map indicates for each of the lighting devices at least lighting device position and lighting device on/off state;
- obtaining contextual information for a user, wherein the contextual information includes current user location, time of day, and one or more indications of: user movement, sound in proximity to the user's location, ambient light level in proximity to the user's location, user's calendar events, device interactions by the user and web interactions by the user;
- based on the contextual information, inferring a user task and a lighting need associated with the user task;
- based on the user location, determining from the lighting map a first subset of the lighting devices that are located in proximity to the user's location, wherein the subset of the lighting devices includes at least a first non-conventional lighting device; and
- controlling the lighting characteristics of the first subset of the lighting devices via one or more of the networks to satisfy the lighting need.

\* \* \* \* \*